(12) United States Patent
Walther et al.

(10) Patent No.: US 6,607,068 B1
(45) Date of Patent: Aug. 19, 2003

(54) METHOD AND DEVICE FOR CONVEYING UNIT LOADS

(75) Inventors: Rene Walther, Landschlacht (CH); Robert Buchi, Weinfelden (CH)

(73) Assignee: IPT Weinfelden AG, Weinfelden (CH)

( * ) Notice: Subject to any disclaimer, the term of this patent is extended or adjusted under 35 U.S.C. 154(b) by 0 days.

(21) Appl. No.: 09/958,644

(22) PCT Filed: Apr. 6, 2000

(86) PCT No.: PCT/CH00/00201

§ 371 (c)(1),
(2), (4) Date: Feb. 11, 2002

(87) PCT Pub. No.: WO00/61470

PCT Pub. Date: Oct. 19, 2000

(30) Foreign Application Priority Data

Apr. 14, 1999 (CH) .............................................. 0690/99

(51) Int. Cl.⁷ .............................................. B65G 47/26
(52) U.S. Cl. .................. 198/456; 198/470.1; 198/803.9
(58) Field of Search .............................. 198/456, 470.1, 198/487.1, 803.9, 803.12

(56) References Cited

U.S. PATENT DOCUMENTS

| | | | |
|---|---|---|---|
| 3,231,061 A | | 1/1966 | Berkmann |
| 3,613,571 A | | 10/1971 | Russell et al. |
| 3,955,496 A | * | 5/1976 | Urban |
| 4,056,185 A | | 11/1977 | Cartwright |
| 4,848,532 A | * | 7/1989 | Lauffer |
| 4,938,337 A | * | 7/1990 | Jowitt et al. |
| 5,183,509 A | * | 2/1993 | Brown et al. |
| 5,188,217 A | * | 2/1993 | Bruno |
| 5,743,377 A | * | 4/1998 | Kronseder |

FOREIGN PATENT DOCUMENTS

| | | |
|---|---|---|
| DE | 11 45 095 B | 3/1963 |
| GB | 2 074 528 A | 11/1981 |

* cited by examiner

*Primary Examiner*—Khoi H. Tran
(74) *Attorney, Agent, or Firm*—Rankin, Hill, Porter & Clark LLP

(57) ABSTRACT

For conveying piece goods, holding devices (2) are utilised for holding individual articles (1), which holding devices (2) are mounted on displaceable conveying devices (3) and are closed for the purpose of conveying the articles (1). For loading articles (1) onto essentially continuously conveyed, opened holding devices (2) and/or for unloading articles (1) from essentially continuously conveyed, opened holding devices (2), pairs of article guides (5) and article pushers (6) are conveyed through a loading zone (L) or unloading zone, in parallel to and in synchronism with the holding/conveying devices (2/3). The article guides are stationary relative to the holding/conveying devices and, in a displacement direction essentially transverse to the conveying direction (F), are aligned with the holding devices. For loading, articles (1) are pushed by the article pushers from the article guides (5) into the opened holding devices (2). For unloading, articles are pushed out of the opened holding devices into the article guides (5). The holding devices are designed as guides in the displacement direction. In the loading/unloading zone (L) a drum-like arrangement with horizontal axis of rotation (A) is provided, on which a plurality of pairs of article guides (5) and axially displaceable article pushers (6) are arranged. The drum-like arrangement is also provided with devices for guiding and, if so required, for driving the holding/conveying devices (2/3).

17 Claims, 4 Drawing Sheets

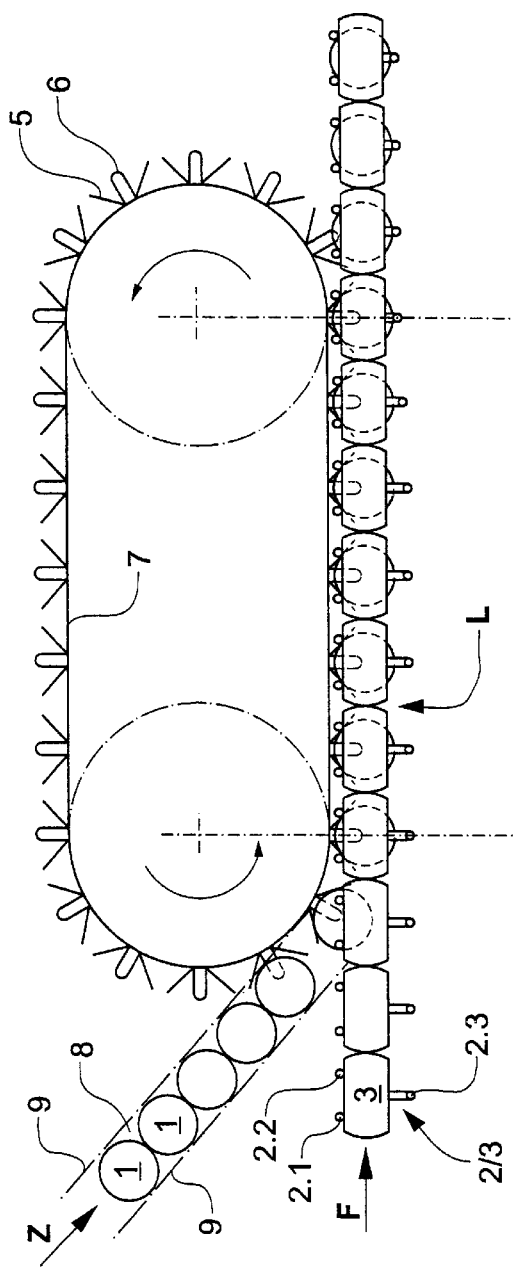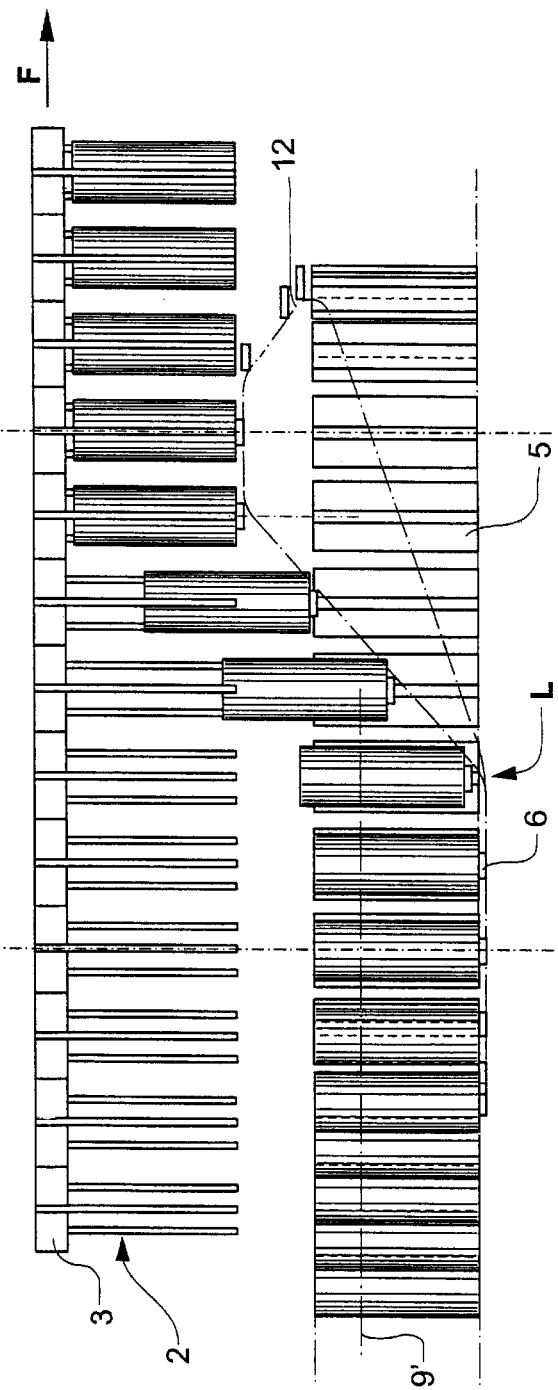
Fig.3

METHOD AND DEVICE FOR CONVEYING UNIT LOADS

The invention is situated in the field of materials handling technology and concerns a method and a device in accordance with the generic terms of the corresponding independent claims. Method and device serve for conveying piece goods, i.e. a large number of articles being conveyed and held and if so required being processed individually or in small groups and being at least similar to one another in such a manner, that they are able to be held and conveyed with the same holding/conveying means. The method according to the invention and the device according to the invention serve in particular for loading the holding/conveying means with articles and/or for unloading articles from the holding/conveying means.

Holding/conveying means for conveying individual articles in a held manner are e.g. grippers which are matched to the articles, which are arranged on a conveying chain at regular distances and which are equipped for gripping an article each at a loading point, for conveying the article along a conveying track and for releasing the article at an unloading point. During conveyance or during an interruption of conveyance, the articles held and conveyed by the grippers can also be processed usually being held in the correct processing position by the grippers, the processing being carried out usually in a regularly clocked manner.

Holding/conveying means for held conveyance of piece goods can also be independent of one another and individually displaceable along a corresponding rail system. In such systems for conveying piece goods, processing operations can be carried out in a regularly clocked manner, wherein the holding/conveying means are clocked into the processing station. It is, however, also possible to guide the holding/conveying means into the processing station with individual distances between them and to activate the station for a processing operation only if a holding/conveying means carrying an article to be processed is detected.

It is the object of the invention to create a method and a device, with which holding/conveying means can be loaded with an article each and the article can be unloaded during essentially continuous or if so required stepwise conveyance, wherein the holding/conveying means are independent of one another or are connected to one another at regular or variable distances. Loading and/or unloading shall not comprise any unguided movement of the articles, in particular in such a way, that the position of every loaded article is exactly defined relative to the holding means. The method according to the invention and the device according to the invention are to be suitable in particular for the conveyance of articles with different formats in such a manner, that a change-over from one article format to another article format can be effected with as little change as possible or with no change of method and device. Nonetheless, method and device are to be simple and applicable for as many different holding/conveying means and applications as possible and the device in accordance with the invention is to be implementable with as few moving parts as possible.

This object is achieved by the method and by the device as defined in the corresponding independent claims.

In the method according to the invention, holding/conveying means are conveyed through a loading and/or an unloading zone. In parallel to the holding/conveying means and in synchronism with them, article guides are conveyed through the loading/unloading zone also, i.e. with the same distances from each other and with the same speed as the holding/conveying means and in such a manner, that one article guide and one holding/conveying means are stationary relative to one another and aligned to one another. During conveyance through the loading/unloading zone, each article guide remains assigned to the one holding/conveying means and articles or groups of articles are pushed out of article guides into holding/conveying means for loading or from holding/conveying means into article guides for unloading, wherein the displacement of the article is carried out substantially transverse to the conveying direction. For the displacement of the articles e.g. article pushers assigned to one article guide each are provided which article pushers carry out a displacement movement substantially perpendicular to the conveying direction in the loading/unloading zone. For guiding the displacement of the articles from the holding means to the article guide and vice-versa in a stable manner and with an essentially unchanged spatial position of the article, it is important, that not only the article guides are designed as guides essentially unchanging in the displacement direction, but also the holding means. This means that the holding means have at least within the zone of the displacement path a constant guide cross-section perpendicular to the displacement direction.

Advantageously, the holding/conveying means are conveyed through the loading/unloading zone—independent of how they are conveyed in other zones of the conveying system—at regular distances between one another and advantageously mechanically coupled with the article guides and article pushers, all being driven by the same drive. It is, however, also possible to convey the holding/conveying means through the loading/unloading zone at irregular distances from one another and to couple at the entrance of this zone one article guide and one article pusher respectively to each holding/conveying means and to maintain this coupling up to the end of the zone.

In a loading zone, for example, the following process steps are carried out:
  Supplying open holding means, article pushers and article guides to the loading zone, every article guide bringing along an article;
  Conveying in a synchronous manner, articles guides, article pushers and holding means in sets of one of each through the loading zone and simultaneously pushing articles from article guides into open holding means by moving the article pushers essentially perpendicular to the conveying direction;
  Closing the holding means at the exit of the loading zone;
  Conveying article guides, article pushers and holding means away from the loading zone, every holding means holding an article.

In an unloading zone, for example, the following process steps are carried out:
  Supplying article guides, article pushers and holding means in sets of one of each to the unloading zone, each holding means holding an article;
  Opening the holding means at the entrance to the unloading zone;
  Conveying article guides, article pushers and holding means in synchronism through the unloading zone and simultaneously pushing articles out of the open holding means into article guides by moving the article pushers essentially perpendicular to the conveying direction;
  Conveying open holding means, article pushers and article guides away from the unloading zone, each article guide carrying an article along with it.

The article guides and article pushers advantageously are designed in such a manner, that gravity holds the articles in a position defined by these means such that further movable parts are not necessary.

If the holding means, article guides and article pushers are suitably designed, the method in accordance with the invention can also serve for loading a small group of articles onto a holding means or for unloading it from the holding means.

Method and device according to the invention are described in detail on the basis of the following Figures, wherein:

FIG. 3 shows a plan view and a side view of a further, exemplary embodiment of the device according to the invention for loading holding means by displacing the articles essentially vertically;

FIG. 6: plan view transverse to the conveying direction).

Figure 1:
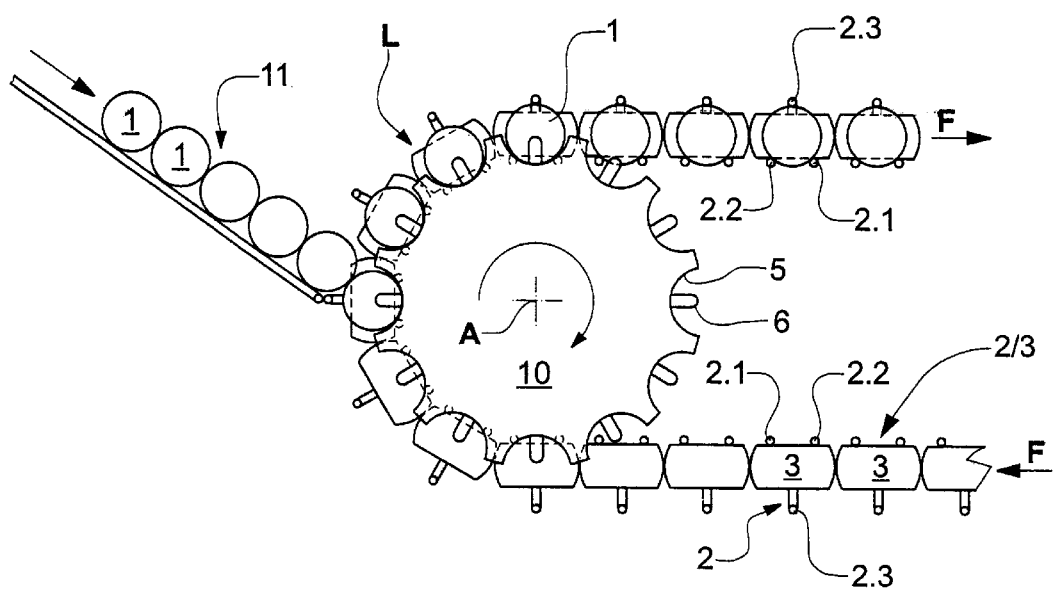
FIGS. 1 and 2 show two side views of an exemplary embodiment of the device in accordance with the invention for loading holding means by displacing the articles essentially horizontally.
Figure 2:
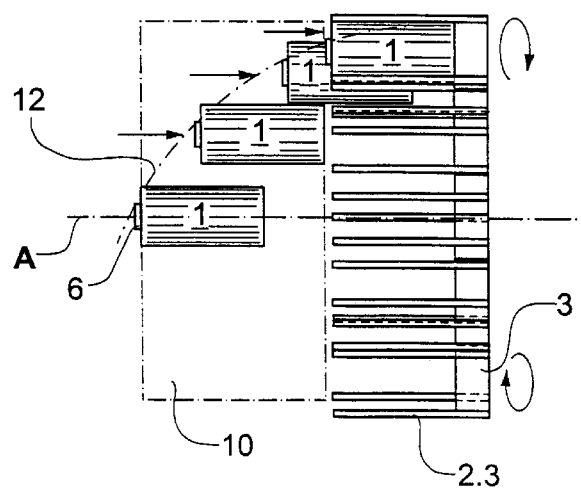

FIGS. 1 and 2 illustrate an exemplary embodiment of a device for loading holding/conveying means 2/3 with articles 1. The device is illustrated in two side views, in FIG. 1 viewed essentially perpendicular to a plane, in which holding/conveying means 2/3 (holding means 2 installed on conveying means 3) are conveyed upwards in a conveying direction F along a circular arc of ca. 180°, and in FIG. 2 viewed essentially parallel to the named plane.

The articles 1 have e.g. a cylindrical shape and the holding means 2 essentially consist of three holding rods 2.1 to 2.3 aligned parallel to the cylinder axis of the articles 1, wherein two holding rods 2.1 and 2.2 are stationary relative to the conveying means 3 and one holding rod 2.3 is displaceable relative to the conveying means 3. The displaceable holding rod 2.3 has an outer position (open holding means) and an inner position, in which it presses an article against the stationary holding rods (closed holding means). The holding rods 2.1, 2.2 and 2.3, in particular the stationary holding rods 2.1 and 2.2 also have a guiding function in the loading process.

Figure 5:
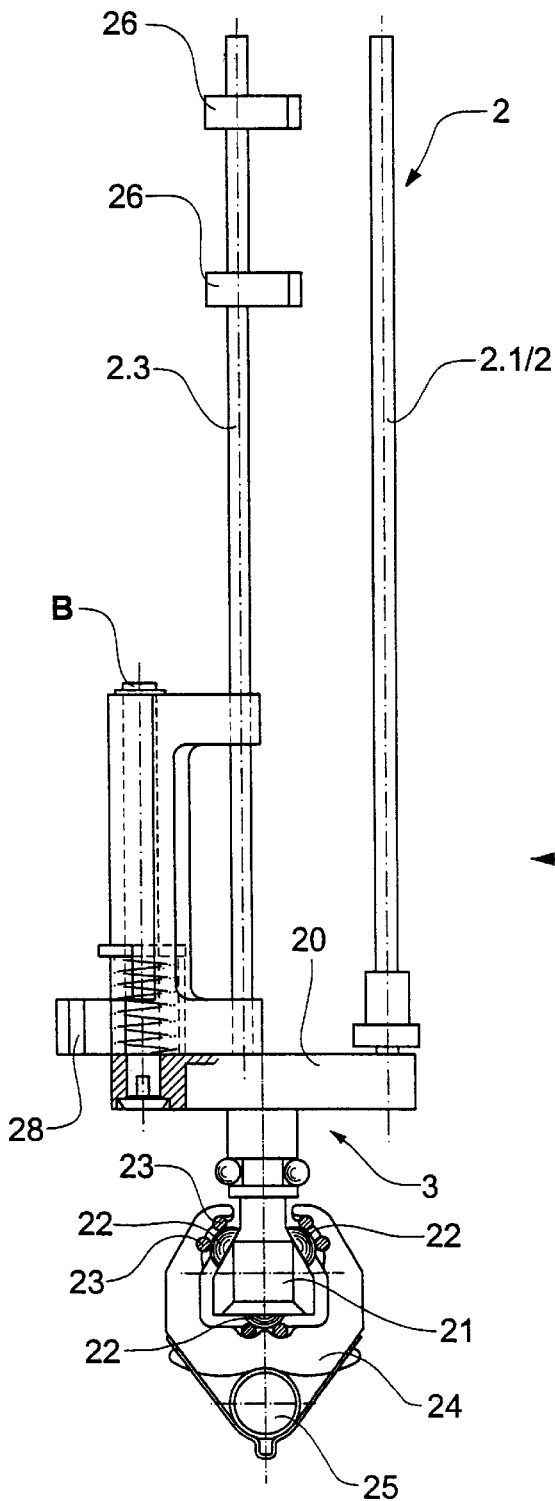
FIGS. 5 and 6 show an exemplary embodiment of holding/conveying means for application in the devices according to FIGS. 1 to 4 for held conveyance of essentially cylindrical articles (FIG. 5: viewed in parallel to the conveying direction.
Figure 6:
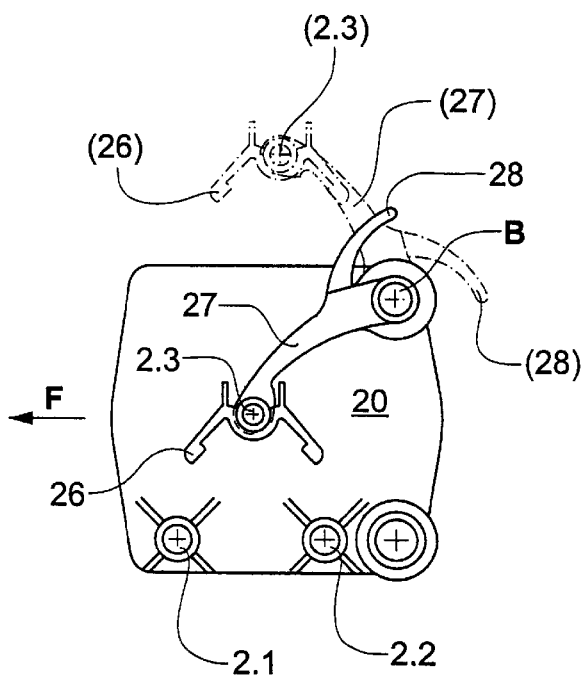

When being supplied to the loading zone L, the holding means 2 are open and at the exit of the loading zone, suitable means are provided for closing them (refer to FIGS. 5 and 6).

The conveying means 3 can be links of a conveying chain or they can be individually movable along rails, while being either connected to one another through flexible connections or not being connected to each other. The conveying means 3 are conveyed through the loading zone at regular distances from one another. Conveying means 3 more or less independent of one another are either conveyed by being pushed and therefore at minimum spacings from each other or driven by equidistant drive cams or coupled to a conveying chain or to a conveyor belt.

Pairs of article guides 5 and article pushers 6 are also conveyed through the loading zone L in parallel with the holding/conveying means 2/3 and in synchronism with these in such a manner, that always one pair of an article guide 5 and an article pusher 6 is aligned with a holding means 2.

The holding/conveying means 2/3 at least along the circular arc are driven by a denticulated wheel (not depicted) and, if they are not connected with one another to form a stable chain, they are guided in a corresponding channel (not depicted).

The article guides 5 are implemented as channel-like recesses of a guide wheel 10, wherein the guide wheel 10 is co-axially arranged with the above-mentioned drive wheel for the holding/conveying means 2/3 and is advantageously rigidly connected with it in such a manner, that the guide wheel 10 and the drive wheel together form a drum-like arrangement with an essentially horizontal axis of rotation A.

This drum-like arrangement is driven to rotate in a clockwise direction and for enabling the force of gravity to position the articles in the article guides 5, the loading zone L is provided between the 9 o'clock position and the 12 o'clock position. Correspondingly the articles 1 driven by the force of gravity, roll out of a buffer 11 and are positioned in the guide means (9 o'clock position). During the onward conveyance they are pushed parallel to the axis of rotation A into the holding means 2 by the article pushers 6 in such a manner, that they are positioned in the holding means 2 in the 12 o'clock position. The holding means are then closed.

For displacing the article pushers 6 perpendicular to the conveying direction e.g. a stationary cam member as indicated with a dot-dash line 12 is provided. For handling articles which are not very sensitive, it is possible also to use a stationary member for displacing the articles instead of the individual article pushers 6 conveyed along with the article guides. Such stationary member is arranged in such a manner that it acts on the articles 1 directly.

The device illustrated in FIGS. 1 and 2 is a loading device. Correspondingly adapted and operated in the opposite direction, however, it can also be utilised as an unloading device. In such a case, instead of the buffer 11, e.g. a downwards inclined roller track is provided for conveying the unloaded articles away. Furthermore, the article pushers 6 are arranged for acting on the article side facing towards the holding means 2 and they are designed to be able to engage between the stationary holding rods 2.1 and 2.2.

In a device in accordance with FIGS. 1 and 2, cylindrical articles with differing axial lengths are pushed into a position in which their trailing side always assumes the same position (reference position) relative to the distal end of the holding means 2 independent of their axial length and without any readjustment of the device and in particular without adjustment of the stroke of the article pushers 6 being necessary. This is very favourable if the articles 1 being conveyed in a held manner are to be processed and it makes it possible in an unloading device based on the same principle to unload the articles independent of their length, once again without having to change the stroke of the article pushers 6.

This means that a piece goods conveying system with a loading and an unloading zone designed in essence in accordance with FIGS. 1 and 2, allows handling of cylindrical articles of different axial length without any adjustment at all, wherein the articles are processed in a processing station between the loading and the unloading zone, in which processing station their one side has to assume a predefined position relative to the distal end of the holding means.

The axial length of the articles is limited on the short side by the distance between article guides 5 and holding means 2 and on the long side also by this distance in combination with the dimensions of the holding means 2 in the direction of the article displacement (length of the holding rods 2.1, 2.2 and 2.3).

Advantageously, the guide means 5 and the holding means 2 are designed in such a manner, that they are able to handle cylindrical articles with diameters variable within predefined limits without requiring readjustment or with simple readjustment only (also refer to FIGS. 5 and 6).

FIG. 3 shows in a plan view (top) and a side view (bottom) a further exemplary embodiment of the device in accordance with the invention for loading of holding/conveying means 2/3 with articles 1. The articles 1 are pushed substantially vertically out of the article guides 5 into the holding means 2 by article pushers 6. The device with minor adaptations and working in the opposite direction is also capable of being used as an unloading device.

Articles 1, holding means 2 and conveying means 3 are in essence the same ones as already described in connection with the FIGS. 1 and 2.

The pairs of article guides 5 and article pushers 6 are installed on an endless chain 7, wherein the chain 7 is e.g. guided and driven by two chain wheels. The articles 1 are supplied (supply direction Z) to the pairs of article guides 5 and article pushers 6, for example on a conveyor belt 8 with lateral guides 9 (indicated by dot-dash lines).

As can be seen from the side view (FIG. 3, bottom), the article pushers 6 carry the articles 1 and push them, guided by the article guides, upwards into the open holding means 2. If so required, a lateral guide is correspondingly continued from the supply zone (indicated by the dot-dash line 9'). When the article pusher 6 has reached its highest position, the corresponding holding means 2 is closed.

For the displacement of the article pushers 6 transverse to the conveying direction, e.g. a stationary cam member (indicated with a dot-dash line 12) is provided. For handling not very sensitive articles it is also conceivable to use the stationary cam member as a displacing means instead of the individual article pushers 6 conveyed long with the articles guides and to arrange it in such a manner, that it acts on the articles 1 directly.

Exactly as described for the embodiment in accordance with FIGS. 1 and 2, also for the embodiment according to FIG. 3 it is applicable, that on handling articles with differing axial lengths, the articles 1 are positioned in the holding means with an unchanged position of their distal ends without any adjustment of the device and in particular without any adjustment of the stroke of the article pushers 6 being necessary. This is an advantage in particular, when the loaded holding means are conveyed to an article processing operation and the articles are processed in a predefined processing position during conveyance and held by the holding means.

FIG. 4, once again as a plan view (top) and as a side view (bottom), illustrates a further exemplary embodiment of the device in accordance with the invention for unloading articles 1 from holding means 2 in an unloading zone E. The device is depicted on top as a plan view, at the bottom as a side view. Articles 1, holding means 2 and conveying means 3 are essentially the same as already described in connection with FIGS. 1 to 3.

Figure 4:
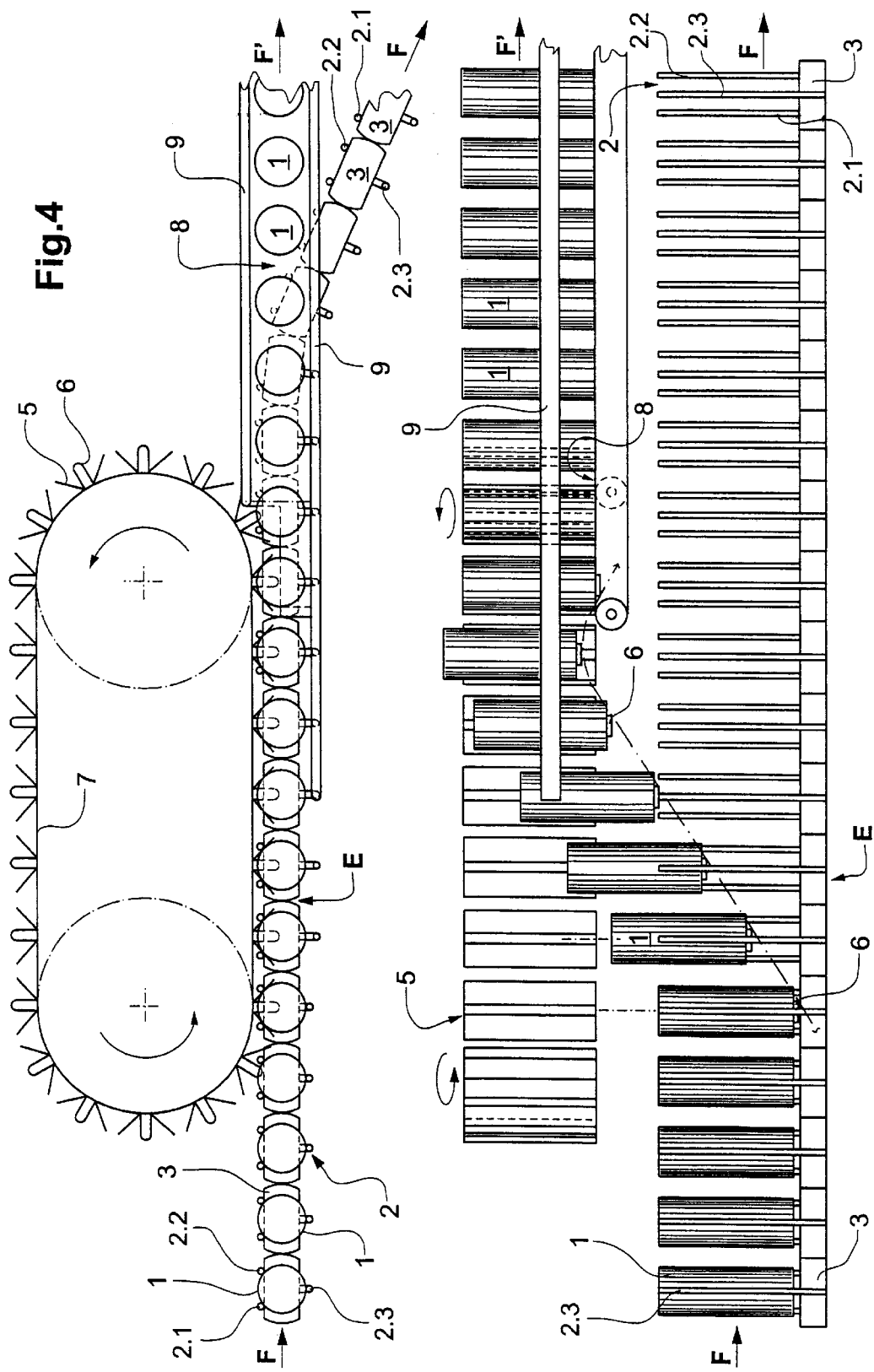
FIG. 4 shows a plan view and a side view of a further, exemplary embodiment of the device according to the invention for unloading holding means by displacing the articles essentially vertically.

The device in accordance with FIG. 4 essentially corresponds to the embodiment according to FIG. 3 (the same components are designated with the same reference numbers), wherein, however, the holding/conveying means 2/3 are arranged underneath the article guides 6 and for unloading, the articles are displaced upwards.

As can be seen from the side view (FIG. 4, bottom), the article pushers 6 engage in the holding means 2 underneath the articles 1. Then, the holding means 2 are opened and during their continuous conveyance through the unloading zone E, the article pushers 6 push the articles 1 upwards out of the holding means 2 and into the article guides 5. Guided by the articles guides 5 and article pushers 6 and held in the guided position by the force of gravity, the articles 1 are brought towards a conveying away means, for example a conveyor belt 8 with lateral guides 9, and are conveyed away from the end of the unloading zone E in the conveying away direction F'.

The device in accordance with FIG. 4 when correspondingly adapted, can be utilised also for loading holding/conveying means 2/3 with articles 1. The direction of the arrows (F, F') in the Figure have to be reversed and instead of the conveyor belt 8 a clocking means is to be provided for positioning the articles 1 in article guides 5 and on article pushers 6.

For the establishment of a reference position of the distal end of articles with different axial lengths, as has already been described in connection with the FIGS. 1 to 3, in a loading device based on the principle of FIG. 4, closing of the holding means has to be accurately synchronised with the lowering of the article pushers and has to be matched to the axial length of the articles.

If in the case of loading or unloading processes with devices, such as illustrated by FIGS. 1 to 4, not every holding means 2, but only specific ones of the holding means are to be loaded or unloaded, then the article pushers 6 have to be designed to be displaceable also perpendicular to the displacement direction in such a manner, that the distal end of a pusher 6 can assume a forward loading position (as illustrated in the Figures) or a withdrawn non-loading position, wherein an article pusher 6 in the non-loading position does not enter into interaction with the article assigned to it.

FIGS. 5 and 6 illustrate an exemplary embodiment of the holding/conveying means 2/3 for application in one of the devices in accordance with FIGS. 1 to 4 or in a similar device for the implementation of the method according to the invention with essentially cylindrical articles. The holding/conveying means 2/3 in FIG. 5 is depicted viewed parallel to the conveying direction F and in FIG. 6 as a plan view essentially transverse to the conveying direction F.

The conveying means 3 comprises a support plate 20, on which a roller body 21 is mounted. The roller body 21 comprises a group of at least three balls 22 contained in a ball cage and each of the balls rolling along two rails 23 respectively and on the other balls of the group. The rails 23 are held in a predefined position relative to one another e.g. by supports 24 being arranged along the rails at a distance from one another and being mounted on a support element 25 extending along the conveying track. The rails 23 form a rail cage, in which the roller bodies 21 are contained and out of which the support plate 20 protrudes.

The support plate 20 on its side opposite to the roller body 21 carries the holding means 2 in the form of three holding rods 2.1 to 2.3, wherein the holding rods 2.1 and 2.2 are rigidly installed on the support plate 20 and the holding rod 2.3 is swivellable transverse to its length around a swivelling axis B into an inner position (closed holding means, indicated with unbroken lines) and into an outer position (open holding means, indicated with dot-dash lines and designated with reference numbers in brackets). The swivelling holding rod 2.3 carries holding wings 26, which are swivellable around the holding rod. By resetting means, which are not illustrated, for example, by a correspondingly arranged spring, the holding rod is driven into its inner position, resp., the holding wings 26 during the swivelling of the holding rod are swivelled in such a manner by a suitable control system, that their position relative to the stationary holding rods 2.1 and 2.2 does not change and in this swivelled position through the effect of the resetting device they are pressed against an essentially cylindrical article positioned between the holding rods. Such it becomes possible to vary the article diameter within limits defined by the positions of the stationary holding rods 2.1 and 2.2 and by the swivelling ability of the swivelling holding rod 2.3.

A swivelling part 27, on which the swivelling holding rod 2.3 is fixed, comprises a control lever 28. In such conveying track zones, in which the swivelling holding rod 2.3 has to be positioned in its outer position (loading or unloading zone), control cam members are provided, by means of which the control lever 28 is brought into and held in its position designated as (28) against the resetting force of the resetting means.

The support plate 20, apart from its support function, is able to take over a spacer function for holding/conveying means 2/3 which are independent of one another or are linked to one another with flexible connecting means. For this purpose, on its leading and its trailing side it has a rounded shape and at least in these zones protrudes over the other parts of the holding/conveying means. When the holding/conveying means are conveyed by being pushed, then a minimum spacing between the holding means 2 defined by the abutting support plates 20 is automatically produced.

For handling articles, which are not cylinder-shaped, but are e.g. rather flat, the holding means 2 have to be correspondingly adapted, for example, they have to be designed as two-part grippers.

What is claimed is:

1. A method for conveying piece goods in a conveying direction (F), wherein articles (1) are loaded one after the other individually or in small groups onto holding means (2), are conveyed being held by the holding means (2) and are unloaded from the holding means (2) and wherein for loading and/or unloading, the articles are pushed into holding means (2) or out of holding means (2) in a displacement direction essentially transverse to the conveying direction (F), and wherein, for loading, the articles (1) are pushed out of article guides (5) and pushed into open holding means (2) and the holding means (2) are then closed and, wherein, for unloading, the holding means (2) are opened and then the articles (1) are pushed out of the open holding means (2) into article guides (5), wherein the article guides are conveyed parallel to and in synchronism with the holding means (2), are stationary relative to the holding means and, in displacement direction, are aligned with the holding means (2).

2. The method according to claim 1, wherein the articles (1) are pushed by article pushers (6), one article pusher (6) being assigned to each article guide (5).

3. The method according to claim 2, wherein, prior to loading or after unloading, the articles (1) are lying loosely on the article guides (5) and/or on the article pushers (6).

4. The method according to claim 2, wherein, for at least one of loading and unloading, the holding means (2), the article guides (5) and the article pushers (6) are conveyed at a regular spacing one after the other through a loading zone (L) or through an unloading zone (E).

5. The method according to claim 1, wherein the articles (1) are essentially cylinder-shaped and have an axis, said articles being displaced in a direction of their axis.

6. The method according to claim 1, wherein only a part of the articles is loaded onto holding means and/or unloaded from holding means.

7. A device for conveying piece goods in a conveying direction (F), wherein articles (1) are loaded onto holding means (2), are conveyed held by holding means (2) and are unloaded from holding means (2) one after the other, either individually or in small groups, and wherein, for loading and unloading, the articles are displaced in a displacement direction essentially perpendicular to the conveying direction (F), the device comprising, for the held conveyance of individual articles (1) or small groups of articles (2), a plurality of holding means (2) mounted on conveying means (3) and being displaceable one after the other, and the device, in a loading zone (L) and/or unloading zone (E) further comprising means for displacing the articles in the displacement direction, wherein the holding means (2) are adapted to be opened and closed, the device further comprises a plurality of article guides (5) adapted to be conveyed parallel to, and in synchronism with, the holding means (2) in the conveying direction (F) through the loading zone (L) and unloading zone (E), said article guide being stationary relative to the holding means (2) and being aligned with said holding means in the displacement direction, and said holding means (2) serve as guides for the displacement of the articles (1) in the displacement direction.

8. The device according to claim 7, wherein the means for displacing the articles (1) in the displacement direction comprise a plurality of article pushers (6) movable essentially transverse to the conveying direction (F), each article pusher (6) being assigned to one article guide (5) and being conveyed together with the article guide through the loading zone (L) and/or unloading zone (E).

9. The device according to claim 8, wherein the article pushers (6) are movable in the displacement direction by means of a stationary cam member.

10. The device according to claim 8, wherein, for controlled loading and unloading of specific holding means (2), the article pushers (6) are further movable in a direction transverse to the displacement direction.

11. The device according to claim 8, wherein the article guides (5) and the article pushers (6) assigned to them are movable on a closed in itself track with a regular spacing between one another.

12. The device according to claim 11, wherein the holding/conveying means (2/3) are adapted to be conveyed through the loading zone (L) and/or unloading zone (E) with a regular spacing between one another and in an essentially straight line and wherein pairs of article guides (5) and article pushers (6) are arranged on a closed in itself chain (7), which is guided by chain wheels, wherein a straight section of the chain runs parallel to the conveyance of the holding/conveying means (2/3).

13. The device according to claim 11, wherein the holding/conveying means (2/3) are adapted to be conveyed through the loading zone (L) and unloading zone (E) with a regular spacing between one another along a circular arc and wherein pairs of article guides (5) and article pushers (6) are arranged on a guide wheel, which itself is arranged co axially with the circular arc.

14. The device according to claim 13, wherein a guide for guiding the holding/conveying means (2/3) and the guide wheel (10) together with the article guides (5) and article pushers (6) cooperate to form a drum-like arrangement.

15. The device according to claim 14, wherein an axis of rotation (A) of the drum-like arrangement is horizontally aligned and the loading zone (L) or unloading zone (E) is arranged between a 9 o'clock position and a 3 o'clock position.

16. The device according to claim 7, wherein the holding means (2) comprise three holding rods (2.1, 2.2, 2.3) that are arranged essentially in parallel and aligned transverse to the conveying direction, wherein two of said three holding rods (2.1 and 2.2) are stationary and a third of said three holding rods (2.3) is displaceable or swivellable into an outer and an inner position relative to the stationary holding rods and is held in the inner position by a resetting means.

17. The device according to claim 7, wherein the holding/conveying means (2/3) are independent of one another or are connected together with flexible connections and comprise a support plate (20), said support plate (20) being designed such that when the holding/conveying means are being conveyed in pushed manner the support plates define a spacing between the holding/conveying means (2/3).

\* \* \* \* \*